United States Patent [19]
Wagensonner et al.

[11] 3,740,130
[45] June 19, 1973

[54] ARRANGEMENT FOR PRODUCING FADE-IN AND FADE-OUT EFFECTS WITH PAIRS OF SLIDE PROJECTORS

[75] Inventors: Eduard Wagensonner; Ulrich Schmidt, both of Muenchen, Germany

[73] Assignee: AFGA-Gevaert Aktiengesellschaft, Leverkusen, Germany

[22] Filed: Mar. 15, 1971

[21] Appl. No.: 124,345

[30] Foreign Application Priority Data
Mar. 25, 1970 Germany.................. G 70 10 970.5

[52] U.S. Cl. ................................. 353/86, 353/105
[51] Int. Cl.. G03b 21/20, G03b 23/16, G03b 23/04
[58] Field of Search ................. 353/86, 83, 90, 93; 352/91

[56] References Cited
UNITED STATES PATENTS
3,161,109  12/1964  Carrillo................................. 353/86
3,282,155  11/1966  Cleary................................... 353/86

Primary Examiner—Louis R. Prince
Assistant Examiner—A. J. Mirahito
Attorney—Michael S. Striker

[57] ABSTRACT

An arrangement wherein two slide projectors project images onto the same area of a screen and wherein the intensity of light furnished by the lamp behind the slide occupying a projection position in one of the projectors is gradually reduced while the intensity of light furnished by the lamp behind the slide occupying a projection position in the other projector gradually increases. The slide changers of the projectors are actuated by cooling fans which are normally driven by motors. The mass of each fan is sufficient to insure continued rotation by inertia when the respective motor is stopped and for an interval which suffices to enable the rotating fan to actuate the respective slide changer. A control unit gradually dims one of the lamps while the other lamp furnishes light of gradually increasing intensity. The control unit thereupon stops the motor for the fan in the projector which contains the lamp furnishing light of reduced intensity and simultaneously connects such fan with the corresponding slide changer so that the latter replaces the slide whose image was projected with fade-out effect while the slide whose image was first projected with fade-in effect is illuminated by light of maximum intensity.

10 Claims, 1 Drawing Figure

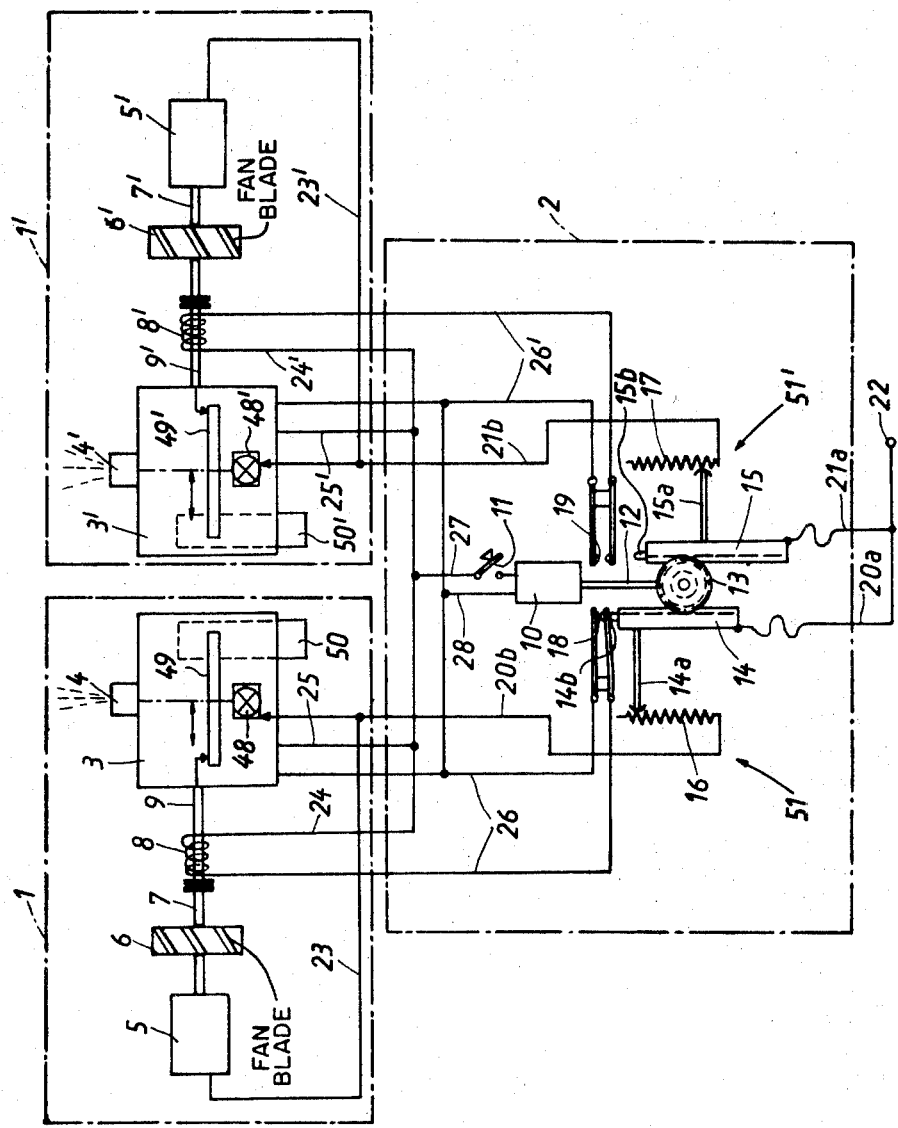

ARRANGEMENT FOR PRODUCING FADE-IN AND FADE-OUT EFFECTS WITH PAIRS OF SLIDE PROJECTORS

BACKGROUND OF THE INVENTION

The present invention relates to improvements in apparatus for projecting the images of still pictures, especially to improvements in slide projectors. More particularly, the invention relates to improvements in arrangements which employ pairs of slide projectors. Still more particularly, the invention relates to improvements in arrangements wherein the image which is projected by one of two slide projectors fades out while the image which is projected by the other slide projector fades in, i.e., to improvements in arrangements wherein the slide projectors can produce an effect known in the art of cinematographic apparatus as dissolve and involving "melting" of one scene into the next.

The fade-in and fade-out effects are produced by gradually reducing the intensity of projection light behind a slide which dwells in projection position behind the lens of one of the projectors and by simultaneously and gradually increasing the intensity of projection light behind a slide which dwells in projection position behind the lens of the other projector. The slide changer of the one projector thereupon replaces the faded-out slide with a fresh slide while the image of the slide occupying the projection position in the other projector is being displayed on the screen.

A drawback of presently known arrangements of the just outlined character is that each of the two projectors requires two separate electric circuits one of which contains the respective projection lamp and the other of which contains a motor for the slide changer. This is due to the fact that the slide changer must carry out an exchange of slides when the projection lamp is off or furnishes light of minimum intensity, and vice versa. Therefore, the presently known arrangements are quite complicated, bulky and expensive. Furthermore, such arrangements necessitate the use of specially designed projectors.

SUMMARY OF THE INVENTION

An object of the invention is to provide an arrangement which embodies two slide projectors capable of producing fade-in and fade-out effects and which is constructed and assembled in such a way that the fade-in and fade-out effects can be produced with minimal outlay for additonal parts and with substantial savings in energy.

Another object of the invention is to provide an arrangement of the just outlined character wherein the fade-in and fade-out effects can be produced by resorting to certain conventional slide projectors.

A further object of the invention is to provide an arrangement wherein the slide changers of the projectors are actuated in a novel and improved way.

An additional object of the invention is to provide a novel control unit for regulating the operation of slide projectors which cooperate to produce fade-in and fade-out effects.

The invention is embodied in an arrangement which comprises two slide projectors and a novel control unit. Each slide projector has a slide changer which is actuatable to move successive or selected slides of a series (e.g., successive slides in a straight or rotary slide tray) to a projection position behind the projection lens, an adjustable light source which can furnish light that passes through the slide occupying the projection position, a flywheel which is connectable with the respective slide changer to actuate the latter, and a prime mover which is operable to drive the respective flywheel. The mass of each flywheel is sufficient to maintain it in rotary motion, following the termination of operation of the respective prime mover, for an interval of time which is needed to effect an actuation of the respective slide changer, i.e., when a prime mover is arrested, the corresponding flywheel continues to rotate for a period of time which is needed to enable the associated slide changer to replace a slide in projection position with a fresh slide. The control means comprises regulating means for adjusting the light sources so as to at least reduce the intensity of light issuing from one of the sources while simultaneously increasing the intensity of light issuing from the other source, for thereupon terminating the operation of the prime mover in that projector which embodies the light source furnishing light of reduced intensity while starting the operation of the other prime mover, and for connecting the slide changer with the rotating flywheel in that projector which embodies the light source furnishing light of reduced intensity while the other flywheel remains disconnected from the associated slide changer but is driven by the respective prime mover.

Thus, the regulating means insures that the image of a slide which occupies the projection position in one of the projectors fades out while the image of a slide occupying the projection position in the other projector fades in. At the same time, the regulating means insures that the flywheel which rotates due to inertia subsequent to termination of operation of the corresponding prime mover is coupled to the associated slide changer so that the latter is capable of exchanging the slide whose image was faded out before the light source in the corresponding projector is adjusted to furnish light of gradually increasing intensity.

Each flywheel can constitute or form part of the cooling fan in the respective slide projector. The means for connecting the flywheels with the respective slide changers preferably comprises electromagnetic clutches.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The FIGURE is a diagrammatic plan view of an arrangement including two slide projectors which are operated in accordance with the present invention.

DESCRIPTION OF THE PREFERRED EMBODIMENTS

The drawing illustrates a first slide projector 1, a second slide projector 1', and a control unit 2 having regulating means which serves to gradually dim the projection lamp 48 of the projector 1 while the projection lamp 48' of the projector 1' furnishes light of high intensity, and vice versa. The projector 1 may but need not be identical with the projector 1'. The projectors 1 and 1' further respectively comprise housings 3, 3', projection lenses 4, 4', channels or recesses for slide magazines or trays 50, 50', slide changers 49, 49', cooling fans 6, 6' and prime movers here shown as electric motors 5, 5' which respectively serve to drive the fans 6, 6'. The fans 6, 6' and the associated motors 5, 5' are accommodated in the respective housings 3, 3' and are shown without such housings merely for the sake of clarity. In accordance with a feature of the invention, the rotors of the fans 6, 6' are relatively heavy so that each thereof can act as a flywheel. These fans 6, 6', are respectively mounted on shafts 7, 7' which can be coupled to the drive shafts 9, 9' for the respective slide changers 49, 49' by electromagnetic clutches represented by their windings 8, 8'. Such electromagnetic clutches form part of the aforementioned regulating means and are available in those slide projectors wherein the motor for the fan also serves to drive the slide changer. When the winding 8 of the clutch between the shaft 7 and 9 is energized, the slide changer 49 can be actuated by the rotating fan 6, either because the fan is rotated by the motor 5 or because the fan 6 continues to rotate due to inertia after the circuit of the motor 5 is opened. The same applies for the clutch which includes the winding 8'. In other words, the mass of the rotors of fans 6, 6' should be selected in such a way that they can actuate the respective slide changers 49, 49' even if the respective motors 5, 5' are idle, namely, during that interval which elapses between the stoppage of the motor 5 or 5' and complete stoppage of the fan 6 or 6'.

The control unit 2 further comprises a servomotor 10 which can be started in response to closing of a master switch 11. The servomotor 10 constitutes a means for changing the resistance of two variable resistors 51, 51' in such a way that the resistance of the resistor 51 increases gradually when the resistance of the resistor 51' gradually decreases and vice versa. The resistors 51, 51' respectively comprise resistance wires 16, 17 and sliders 14a, 15a which receive motion from the servomotor 10 by way of a transmission here shown as including a pinion 13 on the output shaft 12 of the servomotor and two toothed racks 14, 15 which mesh with the pinion 13 and are respectively connected with the sliders 14a, 15a. As shown, the rows of teeth of the racks 14, 15 are mirror symmetrical with reference to a plane passing through the axis of the pinion 13 so that the rack 14 moves upwardly (as viewed in the drawing) when the rack 15 moves downwardly, and vice versa. Furthermore, the racks 14, 15 respectively carry projections or trips 14b, 15b which can actuate two normally open switches 18, 19. The arrangement is such that the switch 18 or 19 is closed by the trip 14b or 15b when the resistance of the resistor 51 or 51' is at a maximum value, and that the switches 18, 19 are free to open when the sliders 14a, 15a are moved in directions to respectively reduce the resistance of the resistors 51, 51'.

The circuitry of the arrangement shown in the drawing is as follows:

The sliders 14a, 15a are connected with one pole 22 of a suitable energy source by way of the toothed racks 14, 15 and flexible conductors 20a, 21a. The wires 16, 17 of the variable resistors 51, 51' are respectively connected with one terminal each of the projection lamps 48, 48' by conductors 20b, 21b, i.e., one terminal of each projection lamp is connected with the pole 22. The pole 22 is further connected with the motors 5, 5' by conductors 23, 23'. The windings 8, 8' are connected to each other by conductors 24, 24' and with the other terminals of the projection lamps 48, 48' by conductors 25, 25'. The windings 8, 8' are further in series with the aforementioned normally open switches 18, 19 by way of conductors 26, 26'. The motor 10 is connected with conductors 27, 28 the former of which contains the master switch 11 and is connected with the circuits of the projection lamps 48, 48'. The conductor 28 is connected with the conductors 26 and 26'.

The operation:

In the illustrated condition of the arrangement, the resistance of the variable resistor 51 is at a maximum value and the intensity of light issuing from the projection lamp 48 is extremely low or zero. The intensity of light furnished by the projection lamp 48' is at a maximum value so that the lens 4' projects onto a screen (not shown) a very bright image of that slide which is located in the housing 3' in the projection position. The circuit of the lamp 48 is completed from the other pole of the energy source, by way of the filament of the lamp 48, conductor 20b, wire 16, slider 14a, rack 14, conductor 20a and to the pole 22. The circuit of the lamp 48' is completed from the other pole of the energy source, by way of the filament of lamp 48', conductor 21b, wire 17, slider 15a, rack 15, conductor 21a and to the pole 22. The lamp 48 is off or furnishes little light because the resistance of the resistor 51 is very high, and the lamp 48' furnishes light of maximum intensity because the slider 15a dwells in the position corresponding to the minimum resistance of the variable resistor 51'.

The switch 18 is held in closed position by the trip 14b of the toothed rack 14. The circuit of the winding 8 is completed because the switch 18 is closed and because the winding 8 is in circuit with the lamp 48'. The circuit of the winding 8' is open because the switch 19 is open and the winding 8' is in circuit with the lamp 48. Thus, the winding 8 is energized by the supply circuit for the lamp 48' so that the shaft 7 can transmit torque to the shaft 9 for the slide changer 49. The fan 6 rotates due to inertia because the motor 5 is off when the resistance of the variable resistor 51 is high. The inertia of the fan 6 suffices to cause the slide changer 49 to carry out an exchange of slides, i.e., to return a slide from the projection position between the lens 4 and lamp 48 back into the tray 50, to withdraw from the tray 50 a fresh slide, and to move such fresh slide into the projection position. In a well known manner, the tray 50 is advanced by a step during the interval between the return of a slide and the withdrawal of a fresh slide. The clutch including the winding 8 remains energized for an interval of time which suffices to complete the exchange of slides by means of the slide changer 49. As mentioned above, the kinetic energy of the fan 6 should suffice to insure actuation of the slide changer 49 while the motor 5 is idle and while the projection lamp 48 is either off or furnishes light of minimum intensity. As also mentioned hereinabove, the motor 5 is off and the lamp 48 is off or furnishes little light when the lamp 48' is on so that the projector 1' projects a bright image of that slide which is held by the slide changer 49' in the projection position behind the lens 4' and in front of the lamp 48'.

When the actuation of the slide changer 49 is completed so that the slide changer 49 has placed a fresh slide into the projection position in front of the lamp 48, the master switch 11 is closed automatically or by hand. The servomotor 10 is started and its output shaft 12 rotates the pinion 13 in a counterclockwise direction, as viewed in the drawing. The toothed rack 14 is caused to move downwardly and the toothed rack 15 moves upwardly. The trip 14b permits the switch 18 to open to thereby deenergize the winding 8 and to thus terminate the torque-transmitting connection between the shafts 7 and 9. Furthermore, the resistance of the variable resistor 51 decreases gradually because the slider 14a is caused to move downwardly. At the same time, the resistance of the variable resistor 51' increases gradually because the slider 15a moves upwardly. Thus, the intensity of light issuing from the lamp 48 increases gradually while the intensity of light issuing from the lamp 48' decreases at the same rate. This produces a desirable fade-in effect in connection with the image of the fresh slide in front of the lamp 48 and a desirable fade-out effect in connection with the image of the slide in front of the lamp 48'. Since the projectors 1 and 1' are assumed to project images onto the same area of the screen, the audience sees a gradual fading of the image of the slide behind the projection lens 4' and a simultaneously occurring gradual brightening of the image of the slide behind the projection lens 4.

When the resistance of the variable resistor 51 decreases to its minimum value, the supply circuit of the projector 1 receives electrical energy at the maximum voltage which causes the lamp 48 to furnish light of maximum brightness. At the same time, the resistance of the resistor 51' reaches the maximum value so that the supply circuit of the projector 1' is caused to bring about a substantial dimming or complete termination of emission of light by the lamp 48'. At such time, the trip 15b closes the normally open switch 19 to thereby energize the winding 8' of the clutch between the shafts 7' and 9'. The motor 5 is on and drives the fan 6 when the resistance of the variable resistor 51 is lowest and the motor 5' is off when the resistance of the variable resistor 51' is highest. Thus, when the winding 8' is energized, the flywheel 6' rotates due to inertia of its mass and actuates the slide charger 49' which removes a slide from the projection position and replaces such slide with a fresh slide which is withdrawn from the tray 50'. The winding 8' is energized because it is connected in the supply circuit of the projector 1. The master switch 11 is thereupon opened, either by hand or automatically. Renewed closing of the master switch 11 causes the servomotor 10 to rotate the pinion 13 in a clockwise direction so that the toothed racks 14, 15 return to the positions shown in the drawing. This results in gradual dimming of the lamp 48 and simultaneous gradual intensification of light which issues from the lamp 48'. Thus, the image of the fresh slide in the projection position behind the lens 4' is faded in while the image of the slide behind the lens 4 fades out.

It is clear that the improved arrangement is susceptible of many additional modifications without departing from the spirit of the invention. For example, the flywheel which rotates when the motor 5 or 5' is on to actuate the slide changer 49 or 49' due to its inertia when the respective motor is off need not constitute the fan for the respective projector. Such flywheel can be driven by the respective fan or it may form part of another unit in the respective projector. Still further, the projector 1 or 1' can be replaced with a projector having two motors the first of which drives the fan and the second of which drives one or more additional movable units in the projector housing. The flywheel can be driven by the first or by the second motor. All that counts is to provide in or on each slide projector a flywheel which is normally driven by a motor but is capable of actuating the respective slide changer while it rotates due to inertia, i.e., not because the circuit of the respective motor is completed.

The flywheels can be built into existing slide projectors. Also, such flywheels can be installed in relatively inexpensive types of slide projectors to thus enable such projectors to present images of slides with fade-in and fade-out effect.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and therefore, such adaptations should and are intended to be comprehended within the meaning and range of equivalence of the claims.

What is claimed as new and desired to be protected by Letters Patent is set forth in the appended claims:

1. In an arrangement of the character indicated, a combination comprising first and second slide projectors each having a slide changer actuatable to move successive or selected slides of a series to a projection position, an adjustable light source, a flywheel connectable with the respective slide changer to actuate the respective slide changer, and a prime mover operable to drive the respective flywheel, the mass of each flywheel being sufficient to maintain the flywheel in rotary motion following the termination of operation of the respective prime mover for an interval which is needed to effect an actuation of the respective slide changer; and control means comprising regulating means for alternately adjusting said light sources so as to gradually increase the intensity of light furnished by one source while gradually reducing the intensity of light furnished by the other source, for thereupon terminating the operation of the prime mover in the projector including said other source while starting the operation of the other prime mover, and for substantially simultaneously connecting the flywheel in the projector including said other source with the associated slide changer to actuate the latter while the other flywheel remains disconnected from the respective slide changer.

2. A combination as defined in claim 1, wherein each of said projectors further comprises cooling means and each of said flywheels forms part of the respective cooling means.

3. A combination as defined in claim 1, wherein said regulating means comprises electromagnetic clutches interposed between said flywheels and the respective slide changers, and means for energizing one of said clutches while the other clutch is deenergized and vice versa, said clutches being energized while the corresponding flywheels rotate due to inertia of their masses.

4. A combination as defined in claim 3, wherein said means for energizing comprises a pair of normally open switches and means for closing one of said switches while the other switch remains open, and vice versa.

5. A combination as defined in claim 4, wherein each of said light sources includes an electric circuit having a projection lamp and said regulating means further comprises variable resistor means in each of said circuits.

6. A combination as defined in claim 5, wherein one of said switches is arranged to connect the clutch means in said first projector in the circuit of said second projector and the other of said switches is arranged to connect the clutch means in said second projector in the circuit of said first projector.

7. A combination as defined in claim 5, wherein said regulating means further comprises servomotor means operable to increase the resistance of one of said variable resistor means while simultaneously reducing the resistance of the other variable resistor means, and vice versa.

8. A combination as defined in claim 1, wherein said prime movers are electric motors.

9. A combination as defined in claim 1, wherein said projectors further comprise projection lenses arranged to project images onto the same area of a screen or the like.

10. A combination as defined in claim 1, wherein said projectors are of identical construction.

* * * * *